(12) United States Patent
Del Signore

(10) Patent No.: US 7,366,548 B2
(45) Date of Patent: Apr. 29, 2008

(54) METHOD FOR ALERTING A MOBILE UNIT OF A MISSED CALL UPON MOVEMENT OF THE MOBILE UNIT

(75) Inventor: Kenneth W Del Signore, North Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/167,471

(22) Filed: Jun. 27, 2005

(65) Prior Publication Data

US 2006/0293037 A1 Dec. 28, 2006

(51) Int. Cl.
*H04Q 7/20* (2006.01)

(52) U.S. Cl. ............... 455/567; 455/414.1; 455/417

(58) Field of Classification Search ............ 455/404.1, 455/556.1, 567, 574; 379/110.01, 142.01, 379/93.23, 90.01; 340/870.11, 539, 870.16
See application file for complete search history.

(56) References Cited

U.S. PATENT DOCUMENTS

| | | | |
|---|---|---|---|
| 6,292,108 B1 * | 9/2001 | Straser et al. ......... | 340/870.11 |
| 6,321,093 B1 * | 11/2001 | Dalal ................... | 455/512 |
| 6,353,730 B1 * | 3/2002 | Buettner et al. ........... | 340/7.1 |
| 6,728,349 B2 * | 4/2004 | Chang et al. ........... | 379/93.23 |
| 2003/0054866 A1 * | 3/2003 | Byers et al. .............. | 455/567 |
| 2004/0152957 A1 * | 8/2004 | Stivoric et al. ........... | 600/300 |
| 2005/0064913 A1 * | 3/2005 | Kim ..................... | 455/567 |
| 2005/0113072 A1 * | 5/2005 | Rodriguez et al. ........ | 455/413 |
| 2005/0250551 A1 * | 11/2005 | Helle ................... | 455/567 |
| 2005/0255874 A1 * | 11/2005 | Stewart-Baxter et al. | 455/550.1 |
| 2006/0105817 A1 * | 5/2006 | Naick et al. .............. | 455/567 |

\* cited by examiner

*Primary Examiner*—Jean Gelin
(74) *Attorney, Agent, or Firm*—John B. MacIntyre

(57) ABSTRACT

The present invention provides a method for alerting a mobile unit of a missed call. A mobile unit receives a call request. If the mobile unit does not answer the call request and the mobile unit is stationary, the mobile unit waits for the mobile unit to move. Upon movement, the mobile unit notifies, via an audible tone, vibration, or a visual indicator, that the mobile unit had a call while it was stationary.

6 Claims, 2 Drawing Sheets

METHOD FOR ALERTING A MOBILE UNIT OF A MISSED CALL UPON MOVEMENT OF THE MOBILE UNIT

FIELD OF THE INVENTION

The present invention relates generally to mobile units, and more particularly to a method for alerting a mobile unit of a missed call.

BACKGROUND OF THE INVENTION

Calls placed to mobile units can arrive when the mobile unit is not on the person of the user or when the mobile unit is stationary. In the situation when the mobile unit is not on the person of the user, the user may not be aware of the missed call.

A user may also miss a call when the mobile unit is located on the user, but the user is unaware that a call request has arrived. For example, if the user is driving, sleeping, or is in a meeting and is unable to hear the ring tone, the user will be unaware of the missed call.

Some phones provide a beep or light that is used to indicate a new voice mail message or a missed call. However, continually generating this signal can be disturbing to a user who does not want to be disturbed. Further, the continual generation of the signal can cause unnecessary degradation of the battery.

Therefore, a need exists for a method of alerting a user of a mobile unit of a missed call in a manner that is beneficial for the user of the mobile unit.

BRIEF SUMMARY OF THE INVENTION

The present invention provides a method for alerting a mobile unit of a missed call upon movement of the mobile unit. A call request is received for the mobile unit. The mobile unit is alerted of the call request. The alerting may be audible, such as a ring tone or song, via a vibration, via a visual signal such as a flashing light, or a combination of the above.

The mobile unit determines if the call request was answered by a user of the mobile unit. If the call request was answered, traditional call processing functionality is performed.

If the call request is not answered, the mobile unit determines if it is stationary. If the mobile unit is moving and the user has not answered the call, the user probably is aware of the call request and not interested in answering the call. In this scenario, the user of the mobile unit will not be alerted of the missed call, but instead the mobile unit performs missed call processing, such as routing the caller to a voice mailbox, forwarding the call to a predetermined call-forwarding number, or other ways to deal with an unanswered incoming call request.

Mobile unit 100 is preferably able to distinguish between movement of the mobile unit and motion caused by ringing or vibrating of the mobile unit. In one exemplary embodiment, the motion detection mechanism located within the mobile unit is disabled during call alerting. Motion detection mechanism may also be able to distinguish between movement of the mobile unit and alerting of the mobile unit. Motion detection mechanism may be programmed to distinguish between short-term movement, which is typically caused by call alerts such as ringing or vibrating, and long-term movement, which is usually caused by movement of the mobile unit.

If the mobile unit is stationary when the call request is received, the mobile unit determines if it has moved. If the mobile unit has not moved since the missed call, the mobile unit continues to check for movement. If movement of mobile unit is detected after a missed call request, the mobile unit alerts a user of the mobile unit of the missed call. The alerting can be audible, visual, or tactile, such as by playing a tone, lighting an indicator light, or vibrating.

Therefore, the present invention provides a method of alerting a user of a mobile unit of a missed call when the mobile unit is next moved, thereby providing a method that is beneficial for the user of the mobile unit.

DETAILED DESCRIPTION OF THE INVENTION

Figure 1:
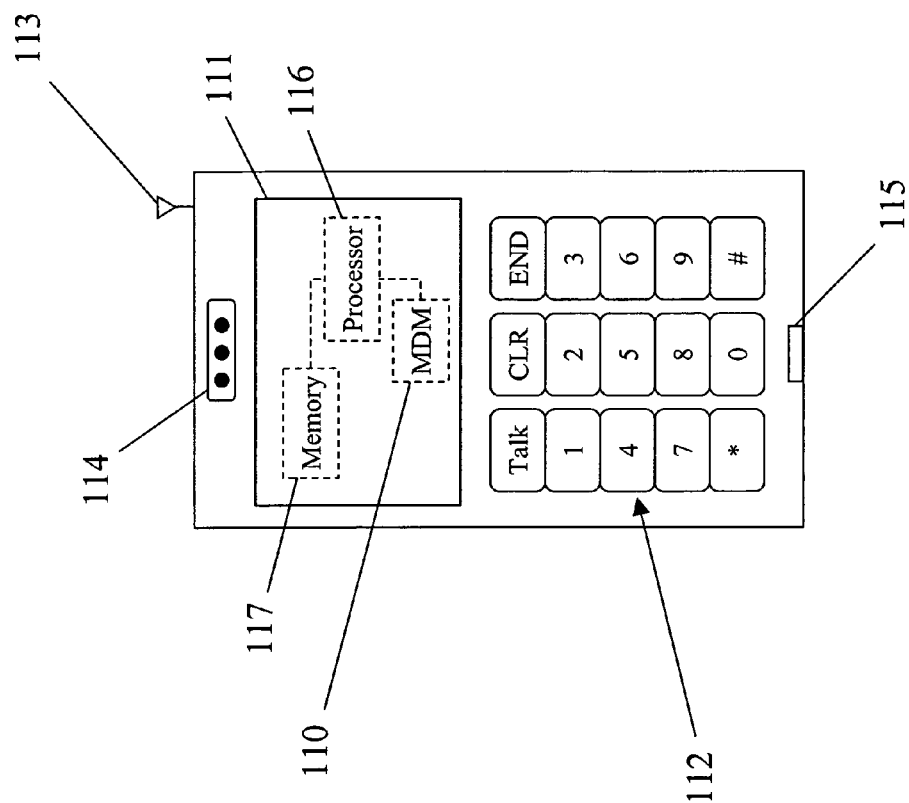
FIG. 1 depicts a mobile unit in accordance with an exemplary embodiment of the present invention.

FIG. 1 depicts a mobile unit 100 in accordance with an exemplary embodiment of the present invention. Mobile unit 100 includes motion detection mechanism 110, display 111, keypad 112, antenna 113, speaker 114, microphone 115, processor 116, and memory 117. Mobile unit 100 can be a cellular phone, a PDA (Personal Digital Assistant), or any other device capable of receiving a wireless call from a wireless communication system. As depicted in FIG. 1, mobile unit 100 is a mobile phone.

Motion detection mechanism 110 is a mechanism that can determine when mobile unit 100 moves. In an exemplary embodiment, motion detection mechanism 110 is an accelerometer, such as a piezo-electric accelerometer, piezo-resistive accelerometer, a shear accelerometer, or a strain gage based accelerometer. Motion detection mechanism 110 can be a one-dimensional, two-dimensional, or three-dimensional accelerometer.

A piezo-electric accelerometer includes a mass attached to a piezo-electric crystal, which is mounted to the case of the accelerometer. When the body of the accelerometer is subjected to vibration, the mass mounted on the crystal wants to stay still in space due to inertia and so compresses and stretches the piezo electric crystal. This force causes a charge to be generated that is proportional to acceleration. The charge output is preferably converted to a low impedance voltage output by the use of integral electronics, as in Integrated Electronics Piezo Electric (IEPE) accelerometers.

Piezo-resistive accelerometers are capable of detecting simultaneous accelerations along two or three axes. Piezo-resistive accelerometers typically include three layers, a glass layer sandwiched between silicon layers. A seismic mass is fabricated at the center of the sensor die and behaves like a pendulum, responding to acceleration and causing deflection of a diaphragm. The opposite silicon layer limits the travel of the seismic mass, thereby preventing the sensor diaphragm from being damaged by excessive acceleration.

Display 111 can be an LCD (Liquid Crystal Display) screen, a TFT (thin-film transistor) technology, CSTN (color super-twist nematic) technology, or any other display capable of presenting an image to a user.

Keypad 112 comprises input buttons that allow a user to make selections and enter information into mobile unit 100.

Antenna 113 is a transceiver that allows personal mobile unit 100 to communicate with a wireless communication network. Antenna 113 may communicate using any wireless protocol, including but not limited to analog, such as AMPS, TACS and NMT, or digital, such as GSM, TDMA, CDMA, GPRS, EDGE, IS-95, IS-95B, HDR, WCDMA, and CDMA2000.

Speaker 114 is a speaker that receives and amplifies audio signals for hearing by a user of mobile unit 100. Microphone 115 provides an interface for speech from a user of mobile unit 100, and relays the speech via mobile unit 100 for transmission over the wireless communication network.

Processor 116 is a microprocessor that includes functionality for controlling and operating mobile unit 100. Processor 116 is preferably interconnected to memory 117 and motion detection mechanism 110.

Memory 117 is storage that is able to store and retrieve various data. Memory 117 can be volatile or non-volatile, and may comprise multiple physical elements.

Figure 2:
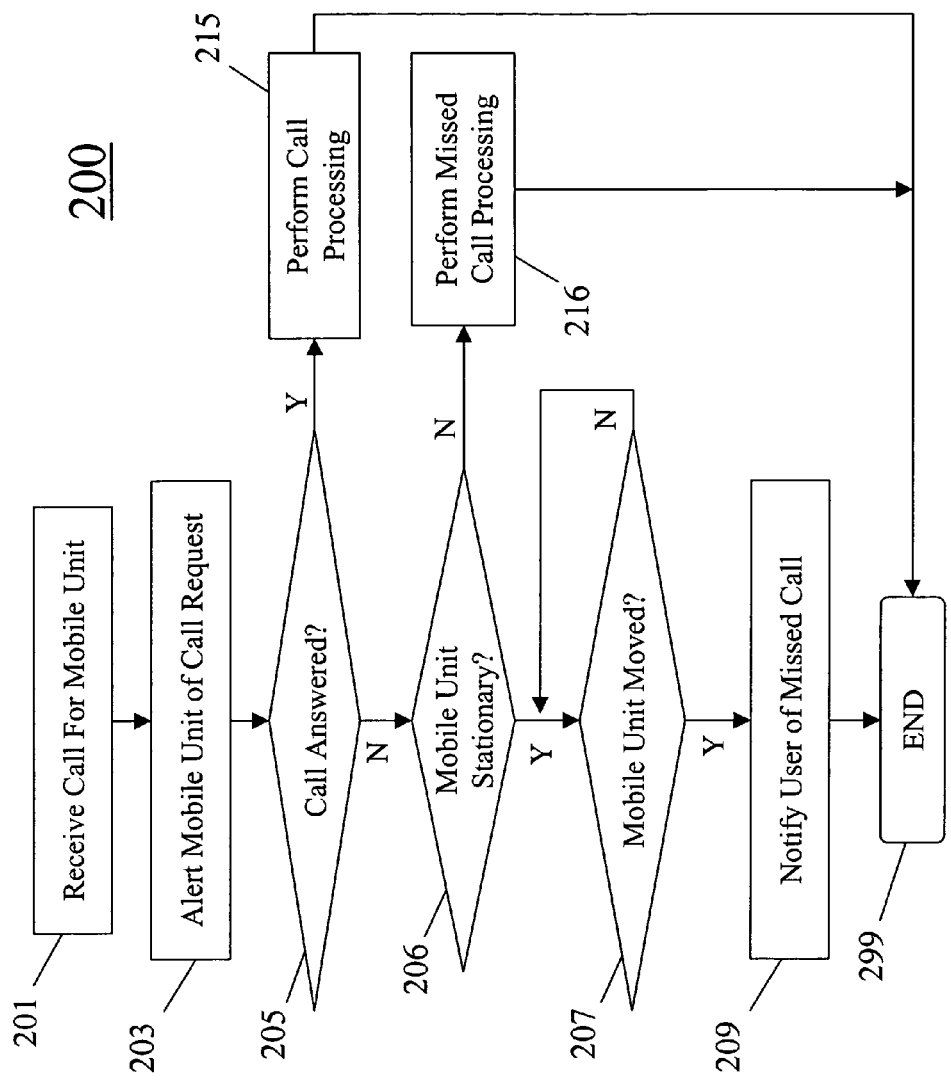
FIG. 2 depicts a flowchart of a method for alerting a mobile unit of a missed call upon movement of the mobile unit in accordance with an exemplary embodiment of the present invention.

FIG. 2 depicts a flowchart 200 of a method for alerting a mobile unit of a missed call upon movement of the mobile unit in accordance with an exemplary embodiment of the present invention.

A Mobile Switching Center (MSC) receives (201) a call request for mobile unit 100. The call request can originate from a wireline or wireless phone, or any other suitable caller. The MSC performs appropriate processing to determine the location of mobile unit 100.

The MSC alerts (203) mobile unit 100 of the call request. In an exemplary embodiment, the MSC sends a signal to a base station that is communicating with mobile unit 100, and the base station sends a call request message over the air to mobile unit 100. The call request message is preferably received by antenna 113.

Mobile unit 100 receives the call request message and alerts a user of the incoming call request. The alert can be audible, such as a ring tone or song, via a vibration of mobile unit 100, via a visual signal such as a flashing light, or a combination of the above.

Mobile unit 100 determines (205) if the call request was answered by mobile unit 100. If the call request was answered by mobile unit 100, the communication system performs (215) traditional call processing functionality, and the process ends (299).

If mobile unit 100 does not answer the call request as determined at step 205, mobile unit 100 determines (206) is mobile unit 100 is stationary. This determination can, for example, determine if mobile unit 100 has not moved for a predetermined period of time, such as in the last 30 seconds. If mobile unit 100 is moving and the user has not answered the call, it most likely indicates that the user is aware of the call request and not interested in answering the call. In this scenario, the user of mobile unit 100 will not be alerted of the missed call, but instead mobile unit 100 performs (216) missed call processing. Missed call processing can include routing the caller to a voice mailbox of mobile unit 100, forwarding the call to a predetermined call-forwarding number, or other ways to deal with an unanswered incoming call request.

In accordance with an exemplary embodiment of the present invention, mobile unit 100 is able to distinguish between movement of mobile unit 100 and motion caused by ringing or vibrating of mobile unit 100 triggered by an incoming call request. In an exemplary embodiment, motion detection mechanism 110 is disabled during call alerting. In a further exemplary embodiment, motion detection mechanism 110 is able to distinguish between movement of mobile unit 100 and alerting of mobile unit 100. In a further exemplary embodiment, motion detection mechanism 110 can be programmed to distinguish between short-term movement, which is typically caused by call alerts such as ringing or vibrating, and long-term movement, which is usually caused by movement of mobile unit 100.

If mobile unit 100 is stationary as determined at step 206, mobile unit 100 determines (207) if mobile unit 100 has moved. If mobile unit 100 has not moved since the missed call, mobile unit 100 continues to check for movement.

In an exemplary embodiment, mobile unit 100 includes a motion detection mechanism 110 that can detect movement of mobile unit 100. If movement of mobile unit 100 is detected at step 207, mobile unit 100 alerts (209) mobile unit 100 of the missed call. The alerting can be audible, visual, or tactile, such as by playing a tone, lighting an indicator light, or vibrating. The process then ends (299).

While this invention has been described in terms of certain examples thereof, it is not intended that it be limited to the above description, but rather only to the extent set forth in the claims that follow.

I claim:

1. A method for alerting a mobile unit of a missed call, the method comprising:
    determining that a mobile unit has received a call request;
    determining that the mobile unit has not answered the call request;
    determining that the mobile unit has moved by distinguishing between movement of the mobile unit and motion caused by alerting the mobile unit of the call request by disabling the motion detection mechanism during call alerting; and
    notifying a user of the mobile unit that the mobile unit missed the call request.

2. A method for alerting a mobile unit of a missed call in accordance with claim 1, wherein step of determining that the mobile unit has moved comprises determining that the mobile unit has moved using a motion detection mechanism.

3. A method for alerting a mobile unit of a missed call in accordance with claim 2, wherein the step of determining that the mobile unit has moved comprises determining that the mobile unit has moved using an accelerometer.

4. A method for alerting a mobile unit of a missed call in accordance with claim 1, the method further comprising the step of, prior to the step of determining that the mobile unit has moved, determining that the mobile unit is stationary.

5. A method for alerting a mobile unit of a missed call in accordance with claim 4, wherein the step of determining that the mobile unit is stationary comprises determining that the mobile unit has not moved for a predetermined period of time.

6. A method for alerting a mobile unit of a missed call in accordance with claim 1, wherein the step of distinguishing between movement of the mobile unit and motion caused by alerting the mobile unit of the call request comprises distinguishing between short-term movement of the mobile unit and long-term movement of the mobile unit.

* * * * *